United States Patent
Crosby et al.

(10) Patent No.: US 6,628,928 B1
(45) Date of Patent: Sep. 30, 2003

(54) INTERNET-BASED INTERACTIVE RADIO SYSTEM FOR USE WITH BROADCAST RADIO STATIONS

(75) Inventors: Stephen P. Crosby, Brookline, MA (US); Gary Keith Noreen, La Canada Flintridge, CA (US)

(73) Assignee: eCARmerce Incorporated, Altadena, CA (US)

( * ) Notice: Subject to any disclaimer, the term of this patent is extended or adjusted under 35 U.S.C. 154(b) by 0 days.

(21) Appl. No.: 09/459,025

(22) Filed: Dec. 10, 1999

(51) Int. Cl.[7] .................................................. H04B 1/40
(52) U.S. Cl. ........................ 455/77; 455/150.1; 455/503; 455/154.1; 455/414.1
(58) Field of Search ................................. 455/414, 456, 455/77, 552, 557, 575, 550, 150.1, 154.1, 161.1, 346, 503; 725/24; 705/26; 370/352, 353; 701/213

(56) References Cited

U.S. PATENT DOCUMENTS

| | | |
|---|---|---|
| 4,788,675 A | 11/1988 | Jones et al. |
| 5,134,719 A | 7/1992 | Mankovitz |
| 5,303,393 A | 4/1994 | Noreen et al. |
| 5,388,101 A | 2/1995 | Dinkins |
| 5,392,353 A | 2/1995 | Morales |
| 5,408,686 A | 4/1995 | Mankovitz |
| 5,455,823 A | 10/1995 | Noreen et al. |
| 5,457,739 A | 10/1995 | Le Cheviller |
| 5,539,635 A | 7/1996 | Larson, Jr. |
| 5,557,541 A | 9/1996 | Schulhof et al. |
| 5,564,073 A | 10/1996 | Takahisa |
| 5,627,549 A | 5/1997 | Park |
| 5,633,872 A | 5/1997 | Dinkins |
| 5,654,719 A | 8/1997 | Kunii |
| 5,659,890 A | 8/1997 | Hidaka |
| 5,689,245 A | 11/1997 | Noreen et al. |
| 5,708,478 A | 1/1998 | Tognazzini |

(List continued on next page.)

FOREIGN PATENT DOCUMENTS

WO    WO 00/31906    6/2000

*Primary Examiner*—Nguyen T. Vo
*Assistant Examiner*—Temica M. Davis
(74) *Attorney, Agent, or Firm*—Carl A. Kukkonen, III

(57) ABSTRACT

An interactive radio system is provided for use with broadcast radio stations wherein feedback is provided to subscribers of the system via the Internet. Interactive radio mobile units are mounted within vehicles or at other locations. Each mobile unit includes a receiver for receiving radio broadcasts, a GPS system for determining the location of the vehicle, and a wireless transmitter for transmitting interactive radio control signals to a network operation center. While listening to a radio broadcast, the subscriber selects program segments of interest by pressing an interactive radio control button on the mobile unit. The program segments are, for example, individual musical selections, advertisements or the like. In response, the mobile unit transmits the carrier frequency of the radio broadcast, the date and time, the geographical location of the vehicle, and a subscriber identification signal to the network operation center using the wireless transmitter. The network operations center determines the identity of the selected program segment based upon the information transmitted from the mobile unit. Then, the network operation center accesses databases providing information pertaining to the selected program segment and provides the information to the subscriber via the Internet, such that the information can later be retrieved by the subscriber using a home or office computer or the like. By providing feedback via the Internet, the subscriber need not make decisions immediately regarding purchase of goods or services while listening to a radio broadcast. Moreover, a vast amount of information may be provided to the subscriber facilitating the purchase of goods or services or the like.

34 Claims, 9 Drawing Sheets

U.S. PATENT DOCUMENTS

| Patent No. | | Date | Inventor | Ref |
|---|---|---|---|---|
| 5,742,893 | A | 4/1998 | Frank | |
| 5,758,293 | A | 5/1998 | Frasier | |
| 5,790,423 | A | 8/1998 | Lau et al. | |
| 5,796,728 | A | 8/1998 | Rondeau et al. | |
| 5,818,441 | A | 10/1998 | Throckmorton et al. | |
| 5,832,223 | A | 11/1998 | Hara | |
| 5,857,149 | A | 1/1999 | Suzuki | |
| 5,857,156 | A | 1/1999 | Anderson | |
| 5,864,753 | A | 1/1999 | Morita | |
| 5,864,823 | A | 1/1999 | Levitan | |
| 5,884,140 | A | 3/1999 | Ishizaki | |
| 5,898,680 | A | 4/1999 | Johnstone et al. | |
| 5,905,865 | A | 5/1999 | Palmer | |
| 5,907,793 | A | 5/1999 | Reams | |
| 5,918,158 | A | 6/1999 | LaPorta | |
| 5,926,108 | A | 7/1999 | Wicks | |
| 5,949,492 | A | 9/1999 | Mankovitz | |
| 5,957,695 | A | 9/1999 | Redford et al. | |
| 5,964,821 | A | 10/1999 | Brunts | |
| 5,979,757 | A | 11/1999 | Tracy | |
| 5,991,601 | A | 11/1999 | Anderson | |
| 5,991,737 | A | 11/1999 | Chen | |
| 6,014,569 | A | 1/2000 | Bottum | |
| 6,018,522 | A | 1/2000 | Schultz | |
| 6,038,434 | A | 3/2000 | Miyake | |
| 6,061,718 | A | 5/2000 | Nelson | |
| 6,081,693 | A | 6/2000 | Wicks | |
| 6,246,672 | B1 * | 6/2001 | Lumelsky | 370/310 |
| 6,253,069 | B1 * | 6/2001 | Mankovitz | 455/186.1 |
| 6,256,498 | B1 * | 7/2001 | Ludwig | 455/433 |
| 6,282,412 | B1 * | 8/2001 | Lyons | 455/186.1 |
| 6,300,880 | B1 * | 10/2001 | Stinik | 340/825.25 |
| 6,314,094 | B1 * | 11/2001 | Boys | 370/352 |

* cited by examiner

FIG. 4

| BROADCASTER ID | CARRIER FREQ. | LOCATION | RANGE |
|---|---|---|---|
| BROADCAST #1 | | | |
| BROADCAST #2 | | | |
| ... | | | |
| BROADCASTER N | | | |

200 — BROADCASTER IDENTIFICATION DATABASE

FIG. 5

| BROADCASTER ID | PROG. SEG. ID | DATE AND TIME |
|---|---|---|
| | SEGMENT #1 | |
| | SEGMENT #2 | |
| | ... | |
| | SEGMENT N | |

202 — PROGRAM SEGMENT IDENTIFICATION DATABASE

INTERNET-BASED INTERACTIVE RADIO SYSTEM FOR USE WITH BROADCAST RADIO STATIONS

BACKGROUND OF THE INVENTION

I. Field of the Invention

The invention generally relates to interactive radio systems and in particular to interactive radio systems for use with broadcast radio.

II. Description of Related Art

U.S. Pat. Nos. 5,303,393, 5,455,823 and 5,689,245 to Noreen et al. describe various interactive radio systems for use with broadcast radio. In one example, individual mobile interactive radio units are installed in motor vehicles or other locations for use by subscribers of the interactive radio system. Each mobile unit includes a radio broadcast receiver, such as a standard automobile radio, and a two-way wireless communication device, such as a satellite-based wireless telephone. Radio broadcasts received by the mobile unit are listened to by the subscriber, perhaps while driving the vehicle. The subscriber may respond to advertisements, solicitations, promotional segments or the like by entering commands through the mobile unit, which are transmitted by the wireless telephone to a network operations center. As one specific example, if the subscriber wishes to purchase a product advertised during a radio broadcast, the subscriber enters an order or purchase command into the mobile unit and the command is forwarded to the network operations center, which coordinates the purchase of the product on behalf of the subscriber. To this end, the broadcast signal may be encoded with sub-signals which identify the product offered for sale during the segment of the broadcast. The mobile unit extracts the product identification from the broadcast signal and generates a purchase command, which identifies the product being purchased along with the identity of the subscriber associated with the mobile unit. The network operations center maintains a credit card number or other purchase authorization information for the subscriber for completing the purchase. If the broadcast signal is a standard radio broadcast signal not encoded with sub-signals, the mobile unit determines the carrier frequency of the broadcast, the date and time of the broadcast, and the geographical location of the mobile unit and then transmits this information along with the purchase command and identity of the subscriber associated with the mobile unit to the network operations center. In response, the network operations center determines the identity of the broadcaster based upon the carrier frequency and the geographical location of the mobile unit, then accesses databases identifying particular program segments broadcast by the broadcaster at various dates and times. With this information, the network operations center determines the goods or services that the subscriber wishes to purchase and completes the purchase on behalf of the subscriber.

Although summarized with respect to an example involving the purchase of goods or services advertised during radio broadcasts, the interactive radio systems of the Noreen et al. patents provide a wide range of other interactive services as well. In other examples, the subscriber may respond to opinion polls solicited through radio broadcasts, or donate money to charities or political causes solicited through the radio broadcast. Additionally, the mobile interactive radio unit may be provided with a graphic display for providing information identifying particular songs broadcast over the radio or particular products advertised in radio broadcasts. In the example wherein the broadcasts are encoded with sub-signals identifying the particular product being offered for sale, the encoded information may be displayed on the graphic display for viewing by the subscriber while listening to the broadcast.

Thus, interactive radio is enabled using radio broadcasters, such as satellite radio broadcasters or conventional AM/FM or digital land-based radio broadcasters. Hence, the audio content need not be transmitted via cables, telephone lines, or other narrow-casting techniques. Moreover, because broadcast radio is employed, operators of the interactive radio system can reach potentially millions of subscribers, including subscribers at remote locations who may not have access to narrow-cast interactive systems such as cable-based systems. Moreover, those who possess only a conventional radio can receive radio broadcasts as normal. Those who possess one of the mobile interactive radio units and are subscribers to the interactive radio system receive the additional benefits provided by the interactive radio system. Hence, the radio broadcasters can reach both subscribers and non-subscribers to the mobile interactive radio system. Another advantage of the system is that the only signals that need to be transmitted from the mobile units to the network operations center are relatively infrequent subscriber command signals generated, for example, when the subscriber selects a product to purchase. Hence, very little bandwidth is required by the wireless communication system to communicate transmissions from the mobile unit to the network operations center.

Although the systems of the Noreen et al. patents have many advantages over non-broadcast-based interactive radio systems, such as cable-based radio systems or other narrow-cast radio systems, room for further improvement remains. For example, it would be desirable to provide an alternative method for providing text or graphic information to the subscriber which does not require that the text or graphic information be transmitted to the mobile unit and displayed on the mobile unit. By providing a method that does not require that the information be displayed on the mobile unit, the mobile unit thereby need not include a graphic display. By eliminating the need to provide a graphic display in the mobile unit, the mobile unit may be less expensive and perhaps less distracting to the subscriber, which is particularly advantageous if the mobile unit is mounted within a motor vehicle for use by the driver of the vehicle. Also, it would be desirable to provide an interactive radio system which is capable of providing vast amounts of text or graphic information to the subscriber pertaining to selected program segment without requiring that the information be transmitted to the mobile unit via the two-way wireless communication device. Also, it would be desirable to provide an interactive radio system wherein the subscriber need not make immediate decisions while listening to the radio about whether to purchase goods or services, contribute to charities or the like. Rather, it would be desirable to permit the subscriber to select advertisements, songs, or other program segments of interest and then review information pertaining to those program segments at a later time.

It is to these and other ends that aspects of the present invention are primarily directed.

SUMMARY OF THE INVENTION

In accordance with the invention, an interactive broadcast system is provided for use with a mobile unit having a broadcast receiver for receiving broadcast transmissions from broadcasters or other broadcast program originators and a wireless transmitter for transmitting wireless signals to the system. The system includes a means for receiving a broadcast attribute signal transmitted from the mobile unit. The broadcast attribute signal identifies at least one attribute of a broadcast transmission selected by a user of the mobile unit. The system also includes means, responsive to receipt of the broadcast attribute signal, for providing information to the user associated with the mobile unit via the Internet. The information provided via the Internet is selected based upon the content of the broadcast transmission selected by the user.

In an exemplary embodiment, the broadcasts are radio broadcasts. The broadcast receiver is a radio, such as an AM/FM automobile radio or a mobile satellite radio. The wireless transmitter is a two-way wireless communication device, such as a satellite wireless communication device or a cellular telephone. The user of the mobile unit is a subscriber of the interactive radio system. The term subscriber, as used herein, refers to a subscriber of the interactive radio system, rather than a subscriber to a particular radio broadcast service, such as a satellite digital radio broadcast service. Depending upon the particular implementation, the individual user of a particular mobile unit may be both a subscriber to the interactive radio system and a subscriber to particular radio broadcast systems. The subscriber may be charged a fee for accessing the interactive radio system. Alternatively, the subscriber may be able to access the system without paying a fee. In still other implementations, users of the interactive radio system need not necessarily subscribe to the system. The broadcast attribute signal transmitted by the wireless communication device identifies the date and time of a program segment selected by the subscriber, the carrier frequency of the broadcast, and the geographical location of the radio as determined using a global positioning system ("GPS") device or, in the case of a mobile unit using a cellular telephone, the geographical location of the cellular base station receiving the wireless transmission. The wireless communication device of the mobile unit also transmits a client identifier signal which identifies either the subscriber using the mobile unit or the mobile unit itself. If the signal identifies the mobile unit, the system accesses client information databases to determine the identity of the subscriber associated with the mobile unit. The system determines the identity of the broadcaster or other program originator based upon the carrier frequency and the geographical location of the mobile unit. Then, the system accesses a database of information provided by the broadcaster, which identifies the date and time of various program segments. From this information, the system identifies the particular program segment selected by the subscriber. The program segment may be an advertisement, charity solicitation, musical selection or the like. Once the program segment has been identified, the system provides information pertaining to the program segment to the subscriber within a web site accessible by a home or office computer of the subscriber or within e-mails transmitted directed to an email account of the subscriber.

In this manner, the subscriber can select various advertisements, musical selections or the like while listening to the radio, then access the Internet at a later time to review information pertaining to the various program segments that have been selected. For program segments that comprise musical selections, the information provided through the Internet identifies such things as the name of the song, the performer, and the compact disk (CD) or other compilation containing the song. Hyper links are provided within the web page or e-mail for linking the subscriber directly to web sites provided by the performer, record company or the like. The CD may be purchased directly through the web site. Alternatively, links are provided for permitting the CD to be purchased through other e-commerce web sites. Also, either the web site of the interactive radio system or other e-commerce sites permit the subscriber to generate and purchase a customized CD containing a group of songs that have been selected by the subscriber or permitting customized digital music files, such as MP3 files, to be generated containing songs that have been selected. For program segments containing advertisements, the information provided via the e-mail or web page identifies the advertiser and provides links directly to e-commerce web sites providing further information regarding the advertiser or its products and permitting immediate purchase of the products. As can be appreciated, a wealth of information may be provided to the subscriber via the Internet pertaining to broadcast radio segments selected by the subscriber.

One advantage of the Internet feedback system of the invention is that the subscriber need not necessarily make decisions immediately regarding purchase of goods or services while listening to the radio broadcast but may defer decisions until a later time. Alternatively, though, the system may be configured such that the subscriber may immediately purchase goods or services via the mobile unit. If so, confirmation of the purchase is provided via the Internet. In still other implementations, the subscriber may enter a purchase order through the mobile unit then, if desired, cancel the order via the Internet at a later time. Another advantage of the Internet feedback system is that the subscriber is directly linked to e-commerce sites permitting ease of purchase of the goods or services. Also, much more information may be provided to the subscriber pertaining to selected program segments than can easily be accommodated via two-way wireless transmissions to the mobile unit. Moreover, by providing text and graphic information through the Internet to a home or office computer of the subscriber, the mobile unit need not necessarily include a graphic display and hence may be less expensive and thereby more desirable for some potential subscribers. Although, in other implementations, a graphic display is provided in some mobile units to permit at least a portion of the Internet content to be browsed directly via the mobile unit.

As noted, in the exemplary implementation, the system identifies specific program content selected by the subscriber by examining the carrier frequency of the broadcast in combination with the geographical location of the mobile unit and programming information provided by the broadcasters. In the alternative, the broadcast itself includes information encoded therein identifying the program segments. If so, the mobile unit, in response to subscriber commands, generates a program attribute signal which specifically identifies the content of the program segment and also provides the identity of the subscriber or the identity of the mobile unit, such that the system need not determine the identity of the broadcaster or the program segment. Insofar as providing program information is concerned, the system may either receive information from various broadcasters for storage in dedicated databases maintained by the system or the system may merely access databases maintained by the broadcasters containing play-lists or other program information. In this regard, many broadcasters provide web pages which provide play-lists specifying the date and time of day of the various songs that have been played. The system may access those web pages to identify specific program segments selected by the subscriber. Also, in the exemplary embodiment, GPS is employed for determining the geographical location of the mobile unit. Other techniques for determining the location of the mobile unit, either precisely or approximately, may be employed. In one example, wherein a cellular communication system is employed, the location of the mobile unit is approximated based upon the location of a cellular base station receiving signals from the mobile unit. Alternatively, a regional interactive radio system may be provided for use within a particular region accessible only by broadcasters within that region. In such an implementation, the identity of the broadcaster may be determined based upon the carrier frequency of the broadcast, rather than based upon both carrier frequency and geographical location.

As can be appreciated, a wide range of embodiments are consistent with the general principles of the invention.

BRIEF DESCRIPTION OF THE DRAWINGS

FIG. 4 illustrates a broadcaster identification database employed by the network operations center of FIG. 3.

FIG. 5 illustrates a broadcast program segment identification database employed by the network operations center of FIG. 3.

DETAILED DESCRIPTION OF THE EXEMPLARY EMBODIMENTS

With reference to the figures, preferred and exemplary embodiments of the invention will now be described. The invention is described primarily with respect to an exemplary interactive radio system for use with standard land-based AM/FM radio broadcasters, a satellite wireless communication system, a GPS system, and the Internet. Several other exemplary systems are also described.

Figure 1:
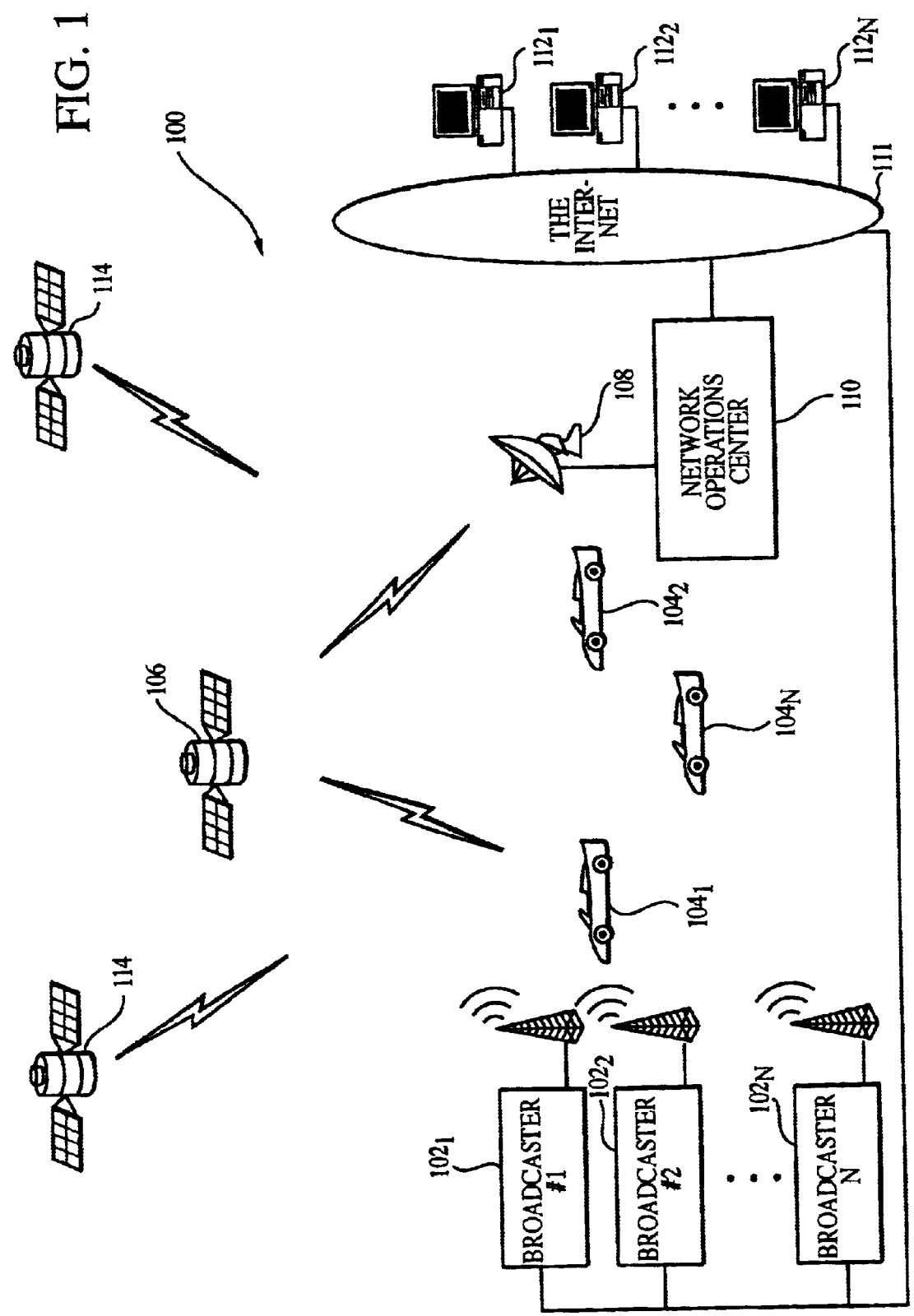
FIG. 1 illustrates a first exemplary interactive radio system employing land-based broadcast radio stations, a satellite wireless communications systems, and a GPS system, and providing interactive feedback to subscribers via the Internet.

FIG. 1 illustrates an interactive radio network 100 wherein signals broadcast by land-based radio broadcasters 102 are received by interactive radio mobile units or mobile stations mounted within vehicles 104, with each mobile unit operated by a subscriber or other user (not separately shown.) While listening to a radio broadcast, the subscribers transmit commands or other responsive signals from the mobile units via a communications satellite 106 to an interactive radio network ground station 108, which forwards the commands to an interactive radio network operations center 110. In response to commands received from the subscribers, the network operations center provides information feedback to the subscribers via the Internet 111, with the information being received at individual subscriber computers 112. In this manner, subscribers operating mobile units mounted within automobiles, trucks, planes, trains or the like, may request information pertaining to program segments broadcast by the various broadcasters, then review the information later via the Internet using home computers, work computers, personal digital assistants (PDAs) or the like. As one specific example, a subscriber selects individual songs of interest, then reviews information pertaining to the songs at a later time using his or her home computer. The subscriber thereby obtains information such as the song name and performer name for various musical selections of interest and, if desired, purchases any or all of the songs via e-commerce Internet sites accessible via the computer. As another example, the subscriber responds to opinion polls solicited via broadcast radio segments, with a summary of the poll results provided to the subscriber via the Internet. In yet another example, the subscriber responds to solicitations for charitable donations requested via radio program segments, with further information pertaining to the charities provided to the subscriber via the Internet, such that the subscriber may then make a final decision regarding whether to donate to the charity in question. Many additional applications of the interactive radio system are possible. In one other application, the system is configured to permit a subscriber to immediately enter a purchase order via the mobile unit, then review confirmation information via the Internet. At that time, the subscriber may choose to cancel the order. If, for example, the order is not canceled within twenty-four hours, the order is automatically completed.

Now considering the system of FIG. 1 in greater detail, a set of land-based radio broadcasters $102_1$ to $102_N$ each broadcast radio signals which, depending upon the individual broadcaster, are conventional AM or FM analog radio signals, digital radio signals, or radio signals encoded with specific program information, such as the information identifying individual program segments. The various broadcasts are received at mobile units mounted within automobiles, trucks, or the like, denoted $104_1$ to $104_N$. Each mobile unit includes a broadcast radio receiver and a wireless transmitter. The broadcast radio receiver is a conventional AM/FM radio receiver, a digital radio receiver or similar device. The wireless transmitter is a satellite wireless communications device, which transmits signals via satellite 106 to interactive radio ground station 108. (Herein-below, alternative implementations utilizing cellular telephone base stations or dedicated localized communication systems are described.) The mobile unit also includes a GPS receiver for receiving signals from a set of GPS satellites 114 and for determining the geographical location of the mobile unit therefrom. (Also herein-below, alternative implementations are described for determining the geographical location of the mobile unit without requiring the use of GPS.)

Figure 2:
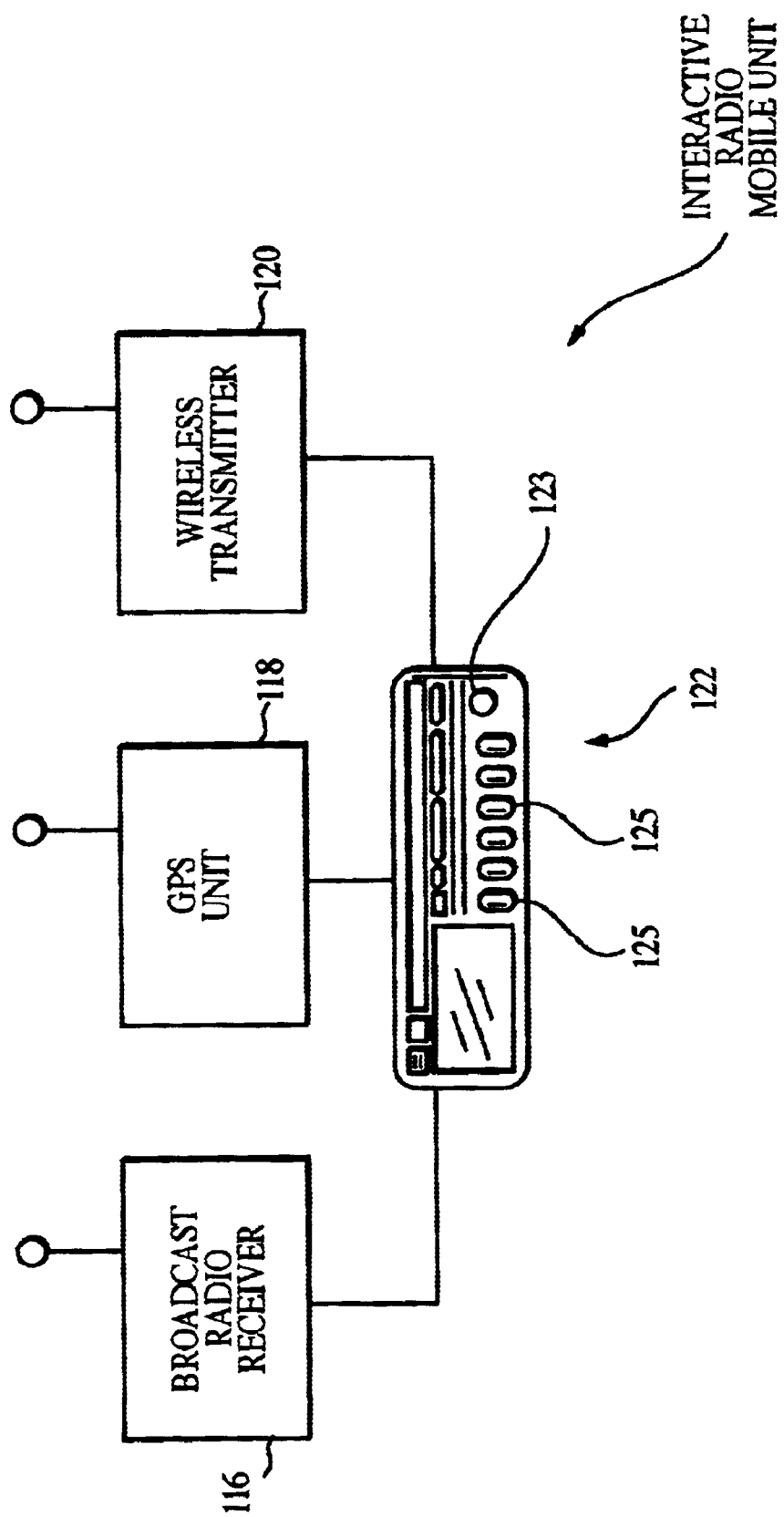
FIG. 2 is a block diagram illustrating pertinent components of a mobile interactive radio unit for use with the system of FIG. 1.

The primary components of the mobile unit are illustrated in FIG. 2 and include a radio receiver 116, a GPS unit 118, a wireless satellite telephone transmitter 120 and a subscriber interface 122 for receiving control signals from an subscriber via one or more input buttons or other input devices. In the example of FIG. 2, only a single interactive radio control button 123 is provided. In other implementations, to be described in greater detail below, additional buttons are provided. The radio receiver may include one or more individual radio receiving components such as a terrestrial digital radio receiver, a satellite digital radio receiver, and a terrestrial AM/FM analog radio receiver. The various components of the mobile unit are preferably integrated as a single unit for installation within the vehicle. Alternatively, the various components may be installed separately within the vehicle. In this regard, the interactive radio subscriber interface 122 may be connected to a conventional GPS device, conventional AM/FM radio, and conventional wireless satellite communication device separately mounted within the vehicle. In either implementation, the subscriber interface is preferably mounted to the dashboard of the vehicle or other convenient location for easy access by the driver or passenger of the vehicle. The subscriber interface receives GPS coordinates from the GPS unit and receives radio broadcast signals from the radio receiver then, in response to commands entered by the subscriber, generates various interactive radio signals for transference to the wireless transmitter for transmission to the network operations center of FIG. 1.

Referring again to FIG. 1, network operations center 110 processes the interactive radio signals transmitted by the mobile unit and generates appropriate feedback to the subscriber via the Internet. More specifically, interactive radio signals transmitted by the mobile unit include: a broadcast attribute signal identifying a carrier frequency of the radio broadcast and the date and time the broadcast was received; a location attribute signal identifying the geographical location of the mobile unit in GPS coordinates at the date and time the broadcast was received; and a subscriber identifier signal providing a subscriber ID or a mobile unit ID. In response to the signals, the network operations center determines the identity of the broadcaster based upon the carrier frequency of the broadcast and the geographical location of the mobile unit. The network operations center then determines the specific program segment selected by the subscriber based upon the identity of the broadcaster and the date and time of the broadcast. Next, the network operations center downloads information pertinent to the program segment and provides that information within a web site accessible by the subscriber, with access granted based upon a subscriber name and password associated with the subscriber ID or mobile unit ID and maintained by the network operations center. The mobile unit ID may, for example, identify the serial number of the mobile unit. If so, the network operation center maintains the subscriber name and password for the subscriber currently registered to use that particular mobile unit. Thereafter, the subscriber may download the information from the web site into his or her computer or PDA by accessing the web site using the subscriber name and password. Alternatively, the network operations center maintains an e-mail address associated with the subscriber ID and transmits e-mail messages containing information corresponding to program segments selected by the subscriber via the designated e-mail address.

In the example wherein the program segment selected by the subscriber is a musical selection, the network operations center provides information including the song title, CD title, performer name, record label and the like within the web site. Additionally, the network operations center provides e-commerce hyper links within the web site to link the subscriber to sites permitting the subscriber to purchase the particular musical selection or CD or to download additional information regarding the performer, record label or the like. The network operations center also provides hyperlinks to e-commerce sites permitting the subscriber to create a custom CD or a custom digital music file, such as an MP3 file, containing some or all of the musical selections of interest. In the example wherein the radio program segment selected by the subscriber is a radio advertisement, the network operations center provides information within a web page identifying the vendor and the specific goods or services offered for sale within the advertisement. The network operations center also provides hyperlinks to web sites provided by the vendor or other e-commerce sites selling goods or services provided by the vendor. In this manner, the subscriber may browse information pertaining to advertisements of interest and perhaps purchase goods or services from the advertisers. In the example wherein the program segment is a request for a charitable donation, the network operations center provides information within the web site identifying the charitable organization and providing hyperlinks to web sites provided by the charitable organization for receiving donations or the like. In the example wherein the program segment contains an opinion poll, the network operations center tallies the results of the opinion poll and transmits the results back to the broadcaster or other entity initiating the opinion poll and may additionally provide the results of the opinion poll within the web page accessible by the subscriber. Based upon the results transmitted to the broadcaster, the broadcaster can then quickly disclose the results of the opinion poll on the air for the benefit of those listening to the radio broadcast. For an implementation wherein only a single interactive radio button is provided, the subscriber responds to the opinion poll by pressing the single button at a specific time identified during the radio broadcast. For example, the broadcast disk jockey (DJ) may indicate that users wishing to enter a YES in response to the opinion poll should press their interactive radio buttons immediately, whereas users wishing to enter a NO in response to the opinion poll should wait until prompted by the DJ. Separate program segments are defined by the broadcaster specifying the two periods of response such that the specific time the subscriber presses the interactive radio button can be correlated with YES or NO, as appropriate. The handling of opinion poll responses using a system wherein the mobile units include multiple interactive radio buttons is described below.

One particular advantage of the system thus far described is that interactive capability is thereby provided in connection with conventional radio broadcast signals not requiring any additional information encoded therein, such as program segment identification information, broadcaster identification information, or the like. If the broadcast signal nevertheless includes encoded signals providing program segment identification information or the like, the system can exploit that additional information as well. An alternative implementation exploiting encoded broadcast signals is discussed below.

Figure 3:
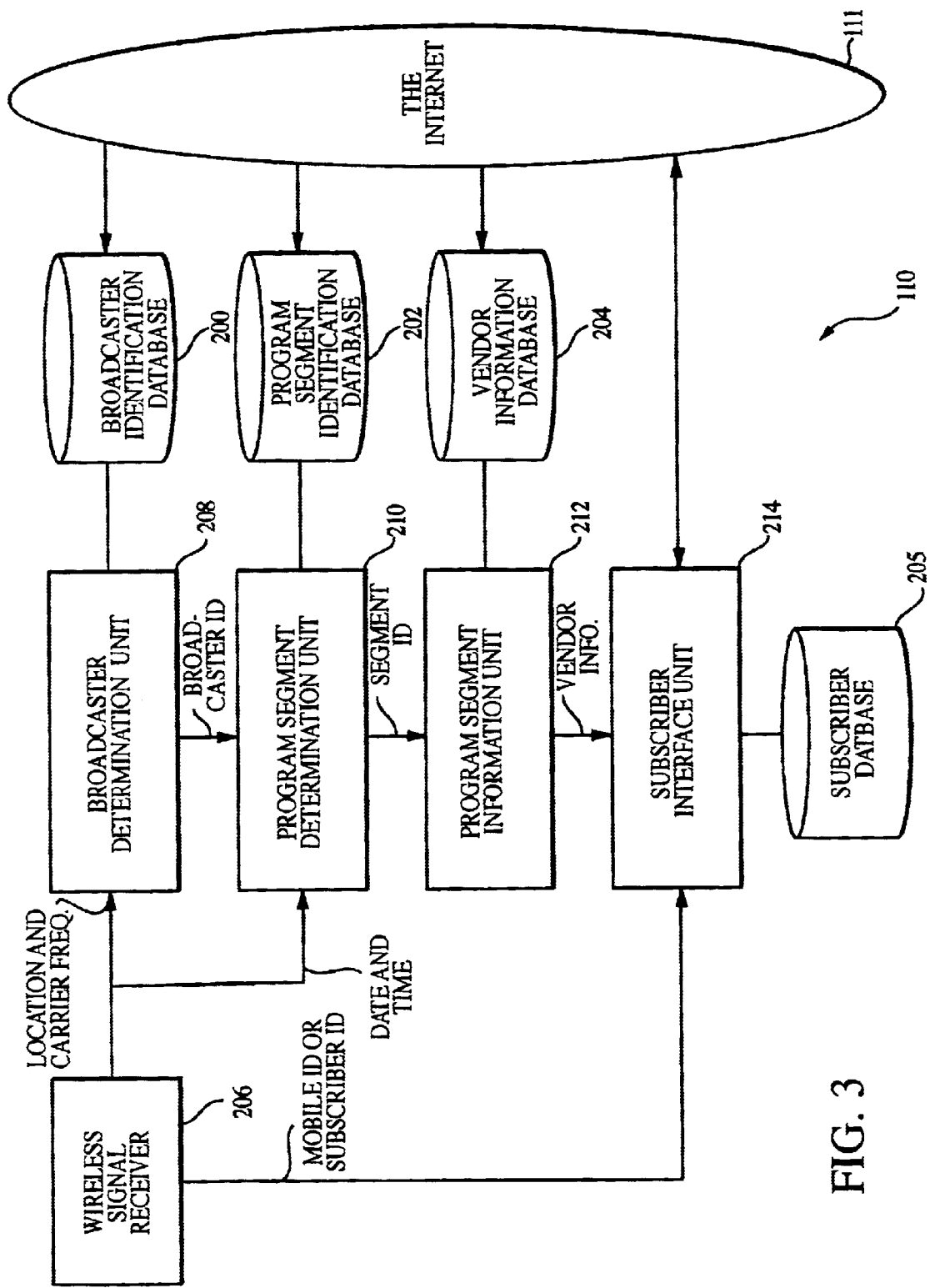
FIG. 3 is a block diagram illustrating pertinent components of a network operations center of the system of FIG. 1.
Figure 6:
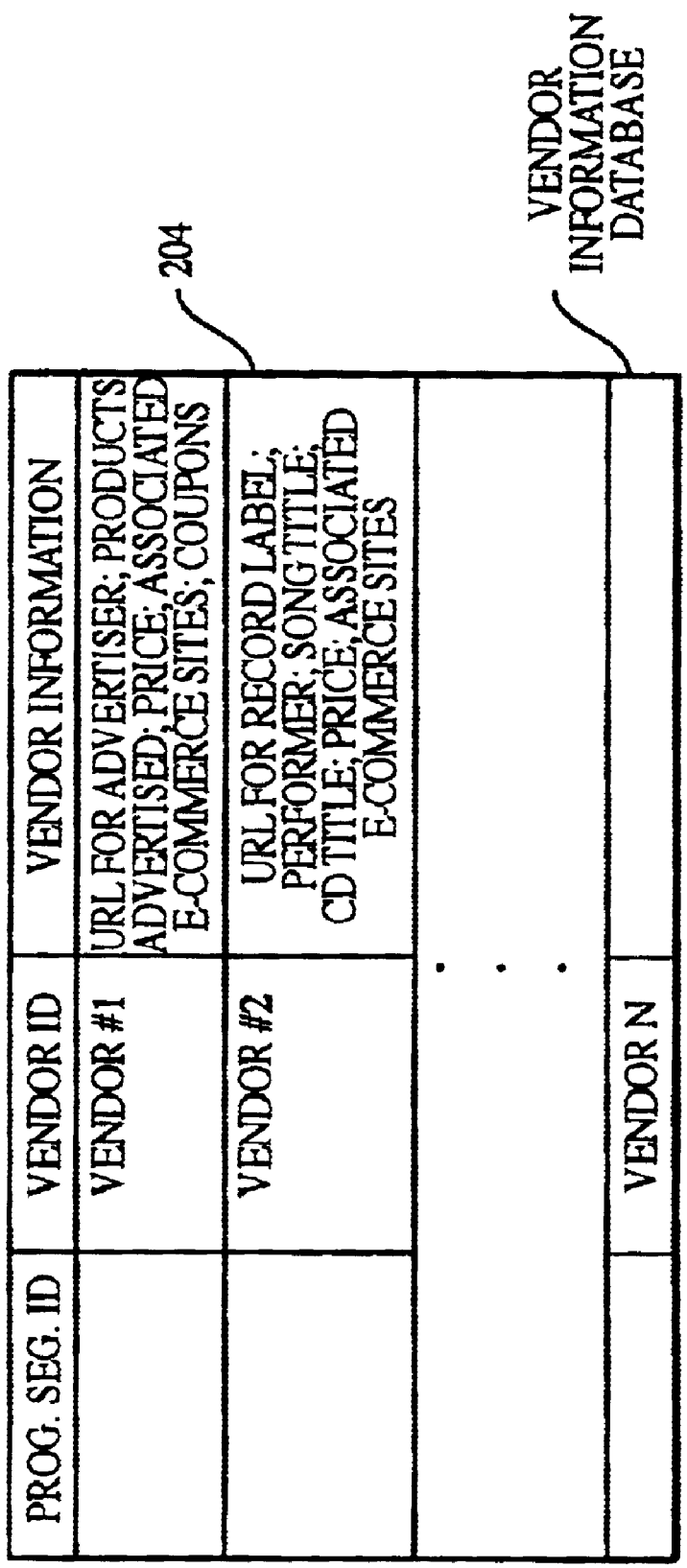
FIG. 6 illustrates a vendor information database employed by the network operations center of FIG. 3.

The operation of the exemplary system will now be further described with reference to FIGS. 3–6. The network operations center of FIG. 3 is pre-loaded with four databases containing information permitting identification of the subscriber, program segments selected by the subscriber, and providing information pertinent to the selected program segments. Specifically, the network operations center includes a broadcaster identification database 200, shown more fully in FIG. 4, which provides, for each broadcaster affiliated with the system, a broadcaster ID, the carrier frequency of the broadcaster, the geographical location of the broadcaster, and a nominal geographical range for reception of signals transmitted by the broadcaster. The geographical location may be specified in terms of latitude and longitude. Alternatively, geographical location may be specified merely in terms of the general location of the broadcaster such as "Los Angeles" or "New York". For AM radio stations, the broadcast range may specify two values, one for daytime broadcasting and one for evening broadcasting. Note that some individual broadcasters will transmit multiple broadcast channels. If so, the broadcaster identification database provides information pertaining to all of the channels broadcast by the broadcaster. The network operations center also includes a program segment identification database 202, show more fully in FIG. 5, which includes a program segment ID, the date and time of broadcast of the program segment, and the broadcaster ID for the broadcaster of the segment. The network operations center additionally includes a vendor information database 204, shown more fully in FIG. 6, which includes the program segment ID along with the identification of the vendor or other entity associated with the program segment and additional information associated with the vendor such as universal resource locator (URL) identifiers for e-commerce sites or other web sites associated with the vendor. The information stored within the broadcaster identification database and within the program segment identification database are received via the Internet from the broadcasters. The information provided within the vendor identification database may be provided either by the broadcasters or by individual vendors. Finally, the network operation center includes a subscriber database 205, which provides the subscriber name and password associated with each mobile unit or provides the e-mail address for the subscriber, such that the system can provide information corresponding to the selected program segments to the subscriber. The subscriber database also provides a credit card number for the subscriber or other purchase authorization codes, such that the system can complete purchases on behalf of the subscriber or assess monthly or annual fees to the subscriber.

Referring again to FIG. 3, the interactive radio signals transmitted from the mobile unit to the network operations center are received by a receiver 206, which forwards the geographical location of the mobile unit as specified by the location attribute signal and the carrier frequency as specified by the broadcast attribute signal to a broadcast determination unit 208. The broadcast determination unit compares the geographical location and the carrier frequency with the information provided within the broadcaster identification database to identify the specific broadcaster associated with the received signal as represented by the broadcaster ID. The broadcaster ID is forwarded to a program segment identification unit 210, which also receives the date and time of the program segment as indicated within the broadcast attribute signal. In response, the program segment determination unit accesses information provided within the program segment identifier database to identify the specific program segment broadcast by the broadcaster at the date and time the program segment was received by the subscriber. Providing the date and time as part of the broadcast attribute signal permits the broadcast attribute signal to be transmitted subsequent to receipt of the program segment by the mobile unit but may require careful clock synchronization between the mobile unit and the network. Alternatively, the date and time is not transmitted as part of the broadcast attribute signal but is detected by the network operations center upon receipt of the broadcast attribute signal. Detecting the date and time at the network operations center eliminates possible clock synchronization problems between the mobile units and the network but may require the broadcast attribute signal to be transmitted substantially immediately by the mobile unit.

In any case, once the program segment is identified, the program segment determination unit forwards the program segment ID to a program segment information unit 212, which accesses the vendor information database using the program segment ID to extract information provided by the vendor pertinent to the program segment which, as noted, may include web site addresses associated with the vendor as well as the names of goods or services offered by the vendor including, for example, song titles and the like. The information retrieved from the vendor database is forwarded to a subscriber interface unit 214, which also receives the subscriber ID for the subscriber of the mobile unit as specified by the subscriber identifier signal received by receiver 206. The subscriber feedback unit then provides the vendor information to the subscriber either within a web page accessible by the subscriber and/or within individual e-mail messages transmitted directly to an e-mail account of the subscriber. To this end, the subscriber interface unit accesses subscriber database 205, which provides the subscriber name and password and the e-mail for the subscriber. The subscriber interface unit may also process purchase transactions directly on behalf of the subscriber using the stored credit card number for the subscriber.

Figure 7:
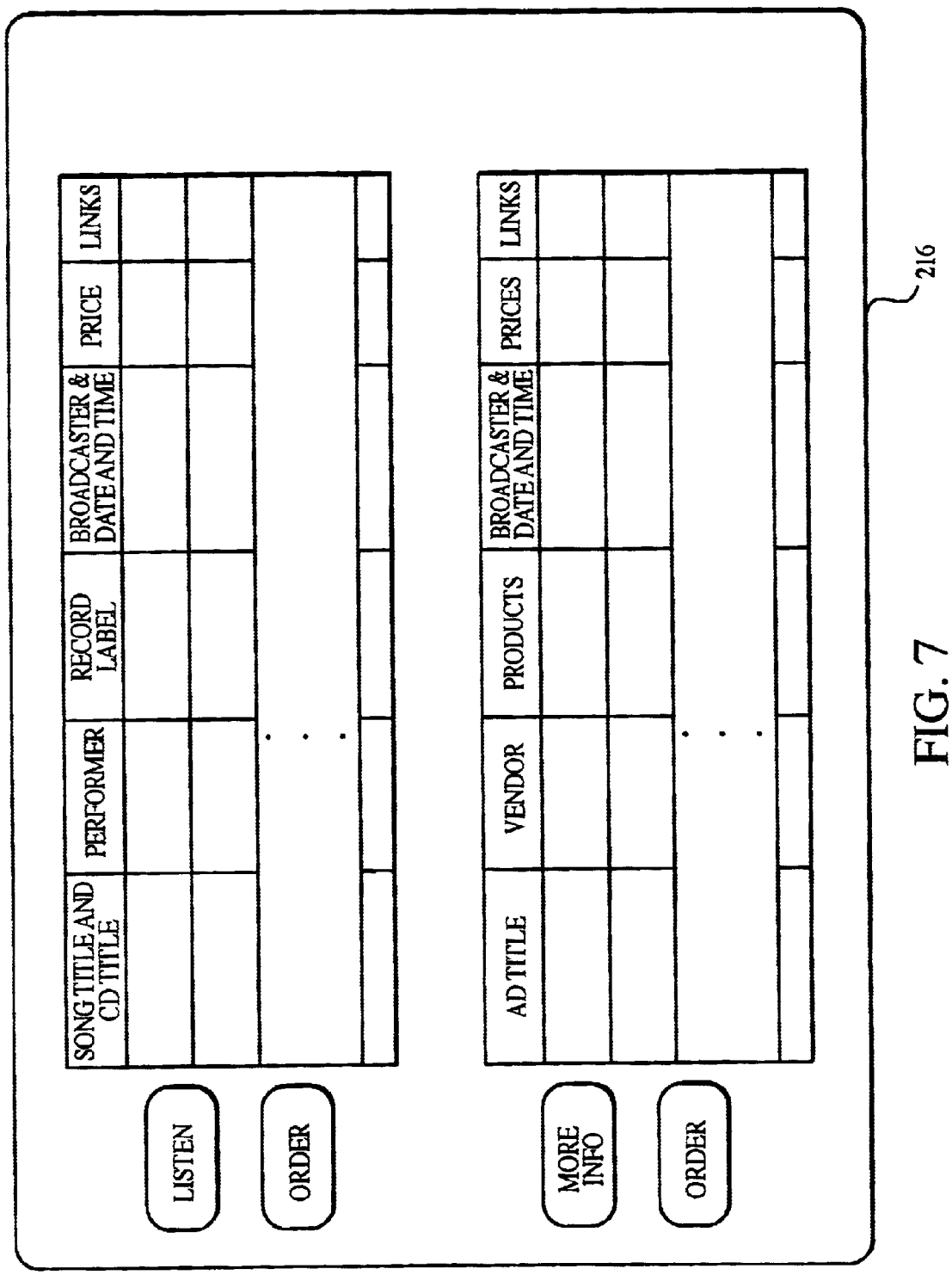
FIG. 7 illustrates an exemplary display screen presented by a web site generated by the network operations center of FIG. 3.

FIG. 7 illustrates an exemplary web page screen 216 accessible by the subscriber. As can be seen, information pertaining to various songs selected by the subscriber are provided including the title of the song, the name of the performer of the song, the radio station broadcasting the song and the date and time of day of the broadcast. Additionally, the web page provides a hyperlink to permit the subscriber to immediately download a digital version of a portion of the song for verifying that the song identified in the list was indeed the song listened to by the subscriber. Additionally, the web page provides links to e-commerce sites permitting the subscriber to purchase the CD in which the song appears or perhaps to create a customized CD containing the song or a customized digital music file. The web page also provides information pertaining to advertisements selected by the subscriber including the name of the vendor, the product advertised, the identity of the broadcaster, and the date and time of the advertisement. Along with each advertisement segment, the web page provides links to e-commerce sites maintained by the vendor or to other e-commerce sites through which the subscriber may purchase the goods or services advertised.

Although not specifically shown, the web page provides numerous additional selectable interface buttons for navigating among various web pages provided by the system or for manipulating the information pertaining to the specific program segments such as, for example, to delete specific segments, to sort program segments either chronologically, alphabetically, or by other criteria, or to perform other functions. Additionally, the web page may include advertising banners advertising goods or services. The specific advertising banners presented to the subscriber within the web page may be correlated with the various program selections made by the subscriber. For example, if the subscriber has selected a number of songs within a particular genre of music, the banner advertisements may be directed to additional e-commerce sites relevant to that genre of music.

The information provided within the web page is accessible using any suitable Internet access technique, including access via PDAs or other portable devices capable of downloading and displaying Internet web pages. In this regard, the mobile unit itself may be provided with Internet access, via the wireless communication system, such that information provided within the web page can be accessed by the subscriber contemporaneously while listening to the radio broadcast during which the various program segment selections are made. Although not specifically shown, similar information may be provided within e-mail messages transmitted directly to the subscriber.

In addition to providing information to the subscriber based upon program segments selected by the subscriber, the system may provide information to the broadcasters pertaining to the various subscribers listening to their broadcast or to the vendors associated with program segments selected by the subscribers. For example, whenever a subscriber selects a program segment broadcast by a particular broadcaster, information identifying the program segment, the date and time of day, the subscriber, and the location of the subscriber are forwarded to the broadcaster such that the broadcaster may develop statistical profiles based upon the information. In one specific application, if the broadcaster determines that subscribers are mostly located in a particular geographical location, then the broadcaster may specifically target advertisers based in that geographical location. As another example, whenever subscribers select a program segment containing an advertisement, information pertaining to the particular advertisement, date and time of day, the subscriber, and the location of the subscriber are forwarded to the advertiser such that the advertiser may develop statistical profiles based upon the information. As can be appreciated, a wide range of information may be provided to broadcasters or vendors to permit those entities to better serve the needs of the various subscribers.

Thus, with reference to FIGS. 1–7, a system has been described which automatically determines the particular program segment selected by the subscriber based upon the geographical location of the mobile unit of the subscriber as determined by for example GPS, the carrier frequency of the broadcaster, and the date and time the broadcast was received. Hence, the system operates effectively with conventional AM or FM radio broadcasters. If implemented in connection with broadcasters broadcasting digital radio, the digital radio signals are preferably encoded with signals identifying the broadcaster and the specific program segment being transmitted. If so, the system need not identify the broadcaster based upon the carrier frequency and geographical location. Rather, the network operations center directly accesses the program segment and vendor information databases based upon the program segment identified by the digital radio signals to retrieve information associated with the program segment selected by the subscriber. Moreover, if the mobile unit is provided with a graphic display, the program segment information provided within the broadcast radio signal may be displayed using the graphic display to the subscriber. If the subscriber wishes to obtain additional information pertaining to the program segment, the subscriber presses the interactive radio button causing the system to ultimately provide the additional information via the Internet to the subscriber for subsequent browsing.

Figure 8:
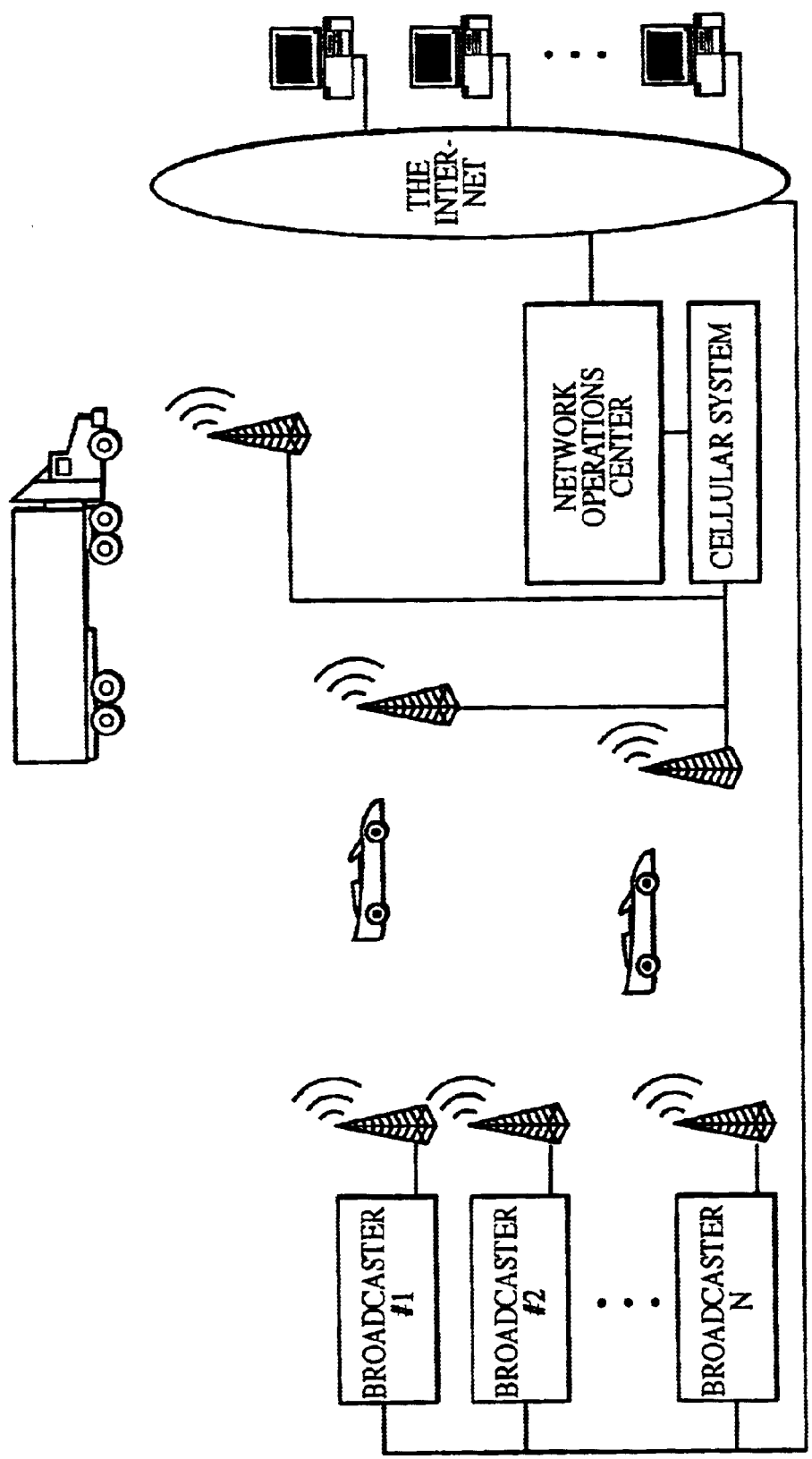
FIG. 8 illustrates a second exemplary interactive radio system employing land-based broadcast radio stations and a cellular communications system, and also providing interactive feedback to subscribers via the Internet.

In an alternative implementation, shown in FIG. 8, the system is configured using a cellular telephone system rather than a satellite wireless communications system. The approximate geographical location of the mobile unit is identified based upon the base station of the cellular system receiving the wireless transmission from the mobile unit. An identification of the geographical location of the base station is forwarded to the network operations center along with the various interactive radio signals received from the mobile unit. The network operations center then determines the identity of the broadcaster based upon the carrier frequency of the broadcast and the geographical location of the cellular base station. Hence, no GPS system or other geographical location determination unit is required as part of the mobile unit.

Figure 9:
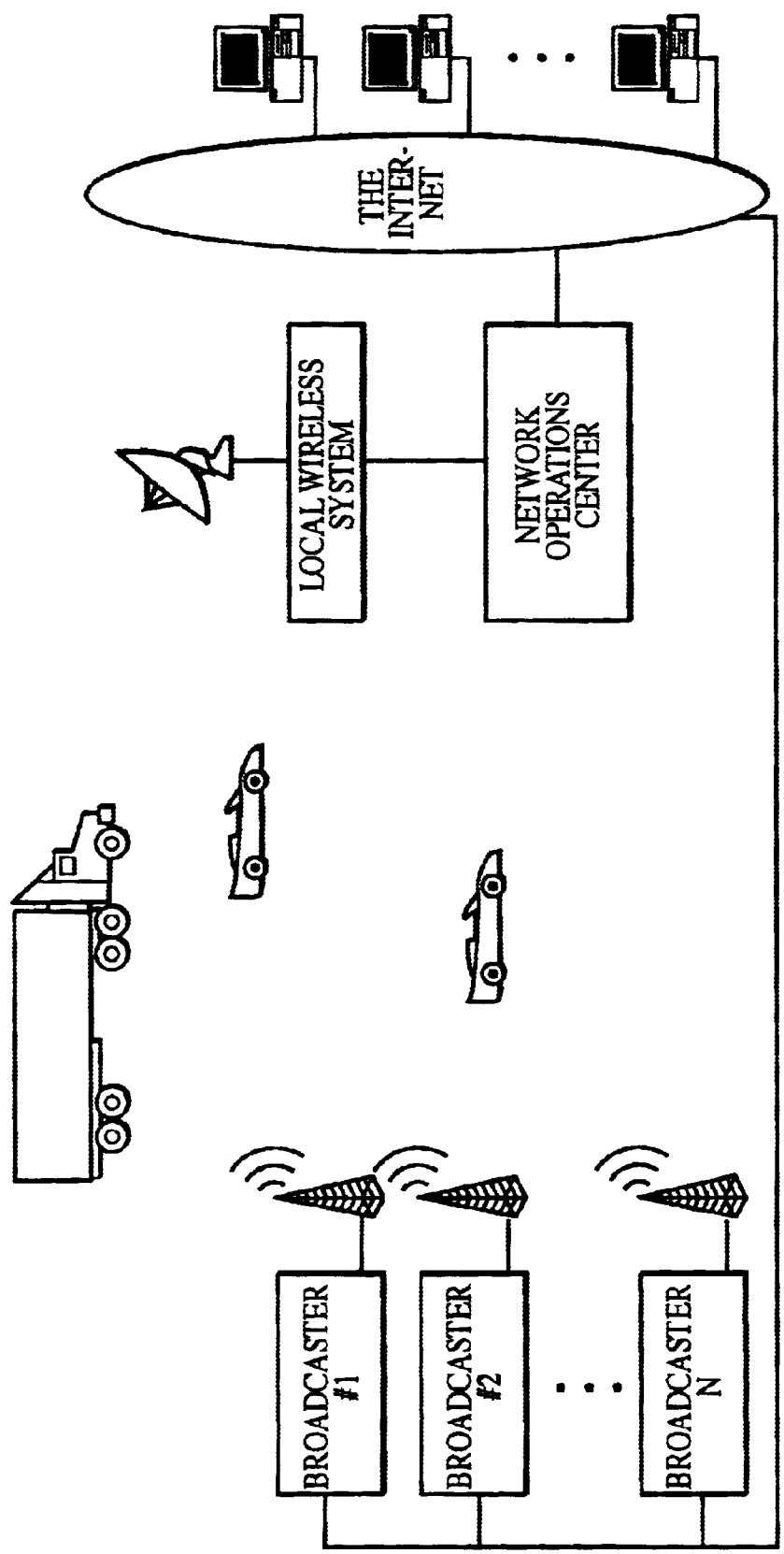
FIG. 9 illustrates a third exemplary interactive radio system employing land-based broadcast radio stations and a dedicated localized communications system, and also providing interactive feedback to subscribers via the Internet.

In another implementation, shown in FIG. 9, the system is implemented within a single geographical area using a dedicated localized wireless communications system maintained by the interactive radio network, such that the network operations center can identify the broadcaster based solely upon carrier frequency rather than upon the carrier frequency and geographical location of the mobile unit. Hence, the geographical location of the mobile unit need not be determined either by GPS, cellular base station location or other means. Also, the broadcaster identification database need not identify the geographical location of the broadcaster or its range. Moreover, since a dedicated localized wireless communication system is employed, the system need not employ either a cellular telephone system or a satellite wireless communication system.

Figure 10:
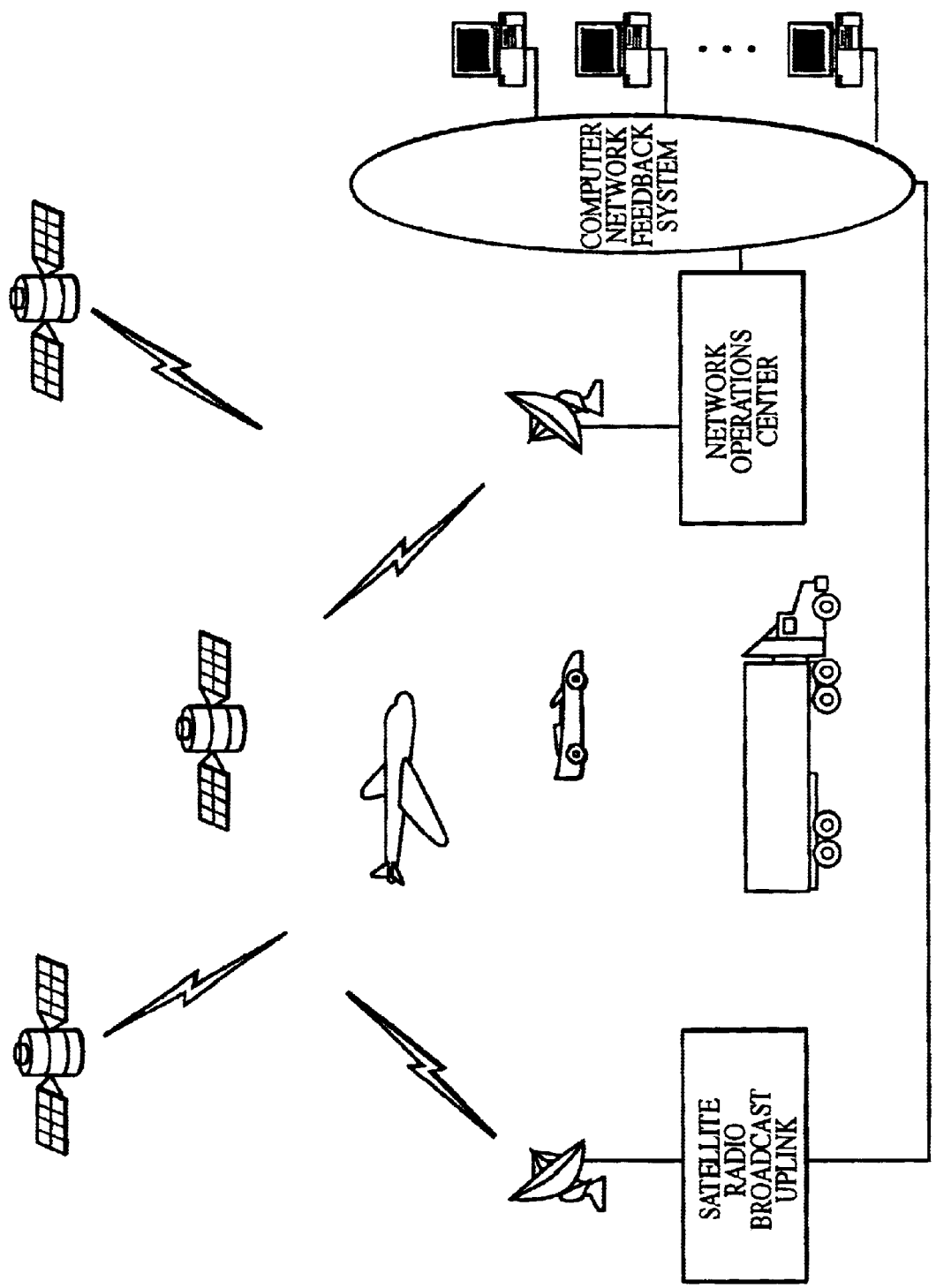
FIG. 10 illustrates a fourth exemplary interactive radio system employing satellite-based broadcasters, a satellite wireless communications system, and a GPS system, and also providing interactive feedback to subscribers via a computer feedback network.

In yet another implementation, shown in FIG. 10, the system is implemented using a satellite radio broadcast system rather than land-based broadcasters. The various implementations illustrated in FIGS. 1–9 may also be configured for use with satellite radio broadcasts. Typically, a satellite broadcaster will transmit multiple radio channels using a single carrier frequency with digital information encoded therein identifying the different channels. When used in conjunction with satellite systems broadcasting multiple channels per carrier frequency, the interactive radio system determines the identity of the particular broadcaster based upon both the carrier frequency and the digital information identifying the broadcast channel. Depending upon the implementation, the mobile unit may be configured to extract the digital information from the received signal along with the carrier frequency for forwarding to the network operation center. In other implementations, the mobile unit generates a broadcast attribute signal which includes a portion of the received satellite broadcast signal such that the network operation center can extract the channel identification information and determine the identity of the particular channel. Terrestrial radio broadcasters may also provide multiple channels per carrier frequency and similar techniques are employed as well for determining the identity of the broadcaster associated with the particular channel being listened to by the subscriber. One particular multiple channel/single carrier system is the Eureka 147 system.

FIG. 10 also illustrates that feedback to the subscriber may be provided through other computer network feedback systems, besides the Internet. One example of an alternative computer network feedback system is an intranet system or other local, regional, or dedicated computer network system accessible by the subscriber.

As noted above, the mobile unit may be provided with multiple buttons or other input mechanisms for receiving various commands from the subscriber. If so, the mobile unit preferably also transmits to the network operation center a subscriber command signal, which identifies the particular button or buttons pressed by the user or which otherwise identifies specific commands entered by the user. In one specific example, the mobile unit may include an alphanumeric keypad for receiving text based commands from the subscriber with the commands being transmitted to the network operation center and processed therein. In another specific example, the mobile unit may be provided with a set of predefined interactive radio buttons with, for example, a first button designated as an "INFO" button and a second button identified as a "ORDER" button. If the subscriber merely wishes to receive additional information pertaining to a program segment, the subscriber presses the INFO button. An INFO command is forwarded along with various other signals to the network operation center which, in response thereto, provides information corresponding to the program segment to the subscriber via the Internet. On the other hand, if the subscriber is certain that he or she wishes to immediately purchase the goods or services offered for sale via a broadcast radio segment, the subscriber presses the "ORDER" button and an ORDER command is forwarded to the network operation center. In response thereto, the network operation center immediately processes the purchase on behalf of the subscriber. The ability to immediately enter a purchase command is particularly desirable for use with special time-limited product offers, such as may be provided within interactive radio shopping channels and the like. Thus, the subscriber can immediately purchase goods or services to ensure that the goods or services do not sell out and to ensure that the price does not subsequently change. Also, in response to radio opinion polls, the subscriber may be invited by the DJ to press the first button to enter a YES response and the second button to enter a NO response. Moreover, in response to product offers, the subscriber may be invited by the advertiser to press the first button to select product A and the second button to select product B. Hence, multiple-choice responses are accommodated. In another specific implementation a single interactive radio button is provided in combination with conventional radio station preset buttons 125. During normal operation, pressing one of the preset buttons re-sets the radio to receive broadcasts from the radio station associated therewith. However, by pressing the interactive radio button immediately prior to pressing one of the preset buttons causes the mobile unit to interpret the preset button in accordance with a specific predetermined interactive radio command, such as an INFO or ORDER command.

As can be appreciated, numerous other implementations are consistent with the general principles of the invention. For example, mobile units may also be provided for use in trains, airplanes, ferries, buses and the like. Systems employing non-mobile units may also be provided. Non-mobile units may be installed in individual homes or offices, retail centers, retail kiosks, Cyber-cafes, Internet boutiques or the like.

Preferably, the overall system is configured to work in combination with a variety of types of broadcasters including conventional AM or FM broadcasters, digital radio broadcasters, satellite broadcasters and the like. The system also preferably works in cooperation with a variety of wireless transmission systems including satellite wireless systems, cellular systems, localized dedicated wireless transmission systems and the like. Depending upon the originating broadcaster and depending upon the mode of wireless transmission, different types of information are received by the network operations center from mobile units, broadcasters etc. The network operations center parses the information received, determines which databases need to be accessed, and provides the requested feedback to the subscriber.

Also, the mobile unit may be configured to perform additional functions as well, including providing May Day functionality and auto-tracking functionality. Insofar as May Day functionality is concerned, the mobile unit may be configured to transmit distress signals to the network operation center in circumstances wherein the vehicle is disabled or wherein the subscriber is otherwise in need of aid. Insofar as auto-tracking functionality is concerned, the mobile unit may provide the ability to track the location of the vehicle or to remotely disable the vehicle, as may be required in the event the vehicle is stolen.

In its various implementations, fees may be charged by operators of the interactive radio network to individual subscribers of the network for access to the network. Additionally, fees may be charged to broadcasters, advertisers, or the like for access to the system.

The invention has been described with reference to specific exemplary systems of an interactive radio system. Principles of the invention, however, are applicable to either applications and to achieve other ends. Hence, the exemplary embodiments described herein should not be construed as limiting the scope of the invention.

What is claimed is:

1. A system comprising:
   a mobile unit having a broadcast receiver for receiving broadcast transmissions from broadcasters and a transmitter for transmitting wireless broadcast attribute and command signals, wherein the mobile unit has one or more command buttons, each for generating a broadcast attribute and command signal in response to the actuation of the command button by a user, wherein the broadcast attribute and command signal identifies which command button was actuated, and the carrier frequency and the time of a broadcast transmission received by the mobile unit from a broadcaster;
   a receiver system for receiving the broadcast attribute and command signal transmitted from the mobile unit and the command button actuated by the user; and
   a processor responsive to receipt of the broadcast attribute and command signal, for providing information to the user of the mobile unit via the Internet representative or the content of the broadcast transmission received by the mobile unit.

2. The system of claim 1 wherein the broadcasts are radio broadcasts and wherein the broadcast receiver of the mobile unit includes a broadcast radio receiver.

3. The system of claim 1 wherein the wireless transmitter of the mobile unit is a satellite wireless communication device, cellular telephone or other local wireless system transmitter.

4. The system of claim 1
   wherein said processor includes
      for identifying the broadcaster based at least in part upon the carrier frequency of the broadcast; and
      means for determining the content of the broadcast transmission based on the identity of the broadcaster and the date and time of the broadcast.

5. The system of claim 4
   wherein said mobile unit further includes a GPS unit; and
   wherein the broadcast attribute and command signal also includes information identifying the geographical location of the mobile unit based on location information and time information received from the GPS unit within said mobile unit; and
   wherein the time within the broadcast attribute and command signal is generated upon the actuation of the command button; and
   wherein said means for identifying the broadcaster includes means for inputting the carrier frequencies of various broadcasts;

means for inputting the geographical locations of various broadcasters;

means for inputting the time of the broadcast attribute and command signal; and means for identifying the broadcaster based upon the carrier frequency of the broadcast transmission, the time of the broadcast transmission, and the geographical location of the mobile unit.

6. The system of claim 4 wherein all broadcasts processed by the system are broadcast by broadcasters in a single general geographical location; and wherein said means for identifying the broadcaster includes means for inputting the carrier frequencies of various broadcasts;

means for identifying the broadcaster based upon the carrier frequency of the broadcast transmission.

7. The system of claim 1 wherein said processor includes means for determining the content of the broadcast transmission received by the mobile unit based at least in part upon the information of the broadcast attribute signal; and wherein said means for determining the content of the broadcast transmission includes means for inputting a list of radio program segments broadcast by the broadcaster including the date and time of broadcast of the segments; and means for identifying the program segment broadcast by the broadcaster based upon the date and time identified by the broadcast attribute signal.

8. The system of claim 1 wherein said broadcast transmission is a frequency modulated (FM) signal or an amplitude modulated (AM) signal.

9. The system of claim 1 wherein said receiver system further includes means for receiving a client identifier signal transmitted from the mobile unit, said client identifier signal identifying at least one unique attribute of a user of the mobile unit.

10. The system of claim 9 wherein said means for providing information via the Internet transmits the information via an email message to an email address associated with the user identified by the client identifier signal.

11. The system of claim 1 wherein said processor provides the information via the Internet in an Internet web site accessible by the user.

12. The system of claim 1 wherein the information representative of said content of the broadcast transmission generated by said processor also provides information to identify the broadcaster and the date and time of the broadcast.

13. The system of claim 1 wherein said the information representative of said content of the broadcast transmission generated by said processor provides an identification of a program segment of the broadcast.

14. The system of claim 13 wherein the program segment is an advertisement provided by an advertiser and wherein the identification of the content of the program segment by said processor includes an identification of goods or services provided by the advertiser.

15. The system of claim 14 wherein the identification of the content of the program segment by said processor includes an identification of an Internet site associated with the advertiser.

16. The system of claim 13 wherein the program segment is a musical selection performed by a performer and wherein the identification of the content or the program segment by said processor includes the name of the musical selection and of the performer.

17. The system of claim 16 wherein the identification of the content of the program segment by said processor includes a link to an Internet site associated with the performer.

18. The system of claim 16 wherein the identification of the content of the program segment by said processor includes information pertaining lo purchasing the musical selection.

19. The system of claim 18 including a fulfillment unit for receiving a purchase order for the musical selection and for fulfilling the purchase order.

20. The system of claim 19 wherein said fulfillment unit generates a digital music file containing music specified by the purchase order and transmits the digital music file containing the music via the Internet to the subscriber.

21. The system of claim 19 wherein said fulfillment unit generates a customized compact disk (CD) containing music specified by the purchase order.

22. The system of claim 1 wherein the information representative of the content of the broadcast transmission received by the mobile unit is dependent on the command button actuated by the user.

23. The system of claim 1 wherein the mobile unit further includes a GPS unit coupled to the transmitter, and wherein the broadcast attribute and command signal further transmitted by the transmitter includes information pertaining to the geographical location of the mobile unit as determined by the GPS unit.

24. A system for use with a mobile unit having a broadcast receiver for receiving broadcast transmissions from broadcasters, wherein the broadcast transmissions contain information encoded therein to identify program segments received by the broadcast receiver, a signal generator for generating a program segment signal based on the information encoded within the broadcast transmissions, and a transmitter for wirelessly transmitting program segment signals to the system, said system comprising:

a receiver for receiving a program segment signal transmitted from the mobile unit; and a processor, responsive to receipt of the program segment signal for providing information to the user of the mobile unit via the Internet representative of the content of the broadcast transmission received by the mobile unit.

25. The system of claim 24 further comprising a a mobile unit having a broadcast receiver for receiving broadcast transmission from broadcasters.

26. The system of claim 24 further broadcaster broadcasting program segments.

27. The system of claim 24 further comprising a subscriber access device with a user interface for displaying information from said processor.

28. A method for use with a mobile unit having a broadcast receiver for receiving broadcast transmissions from broadcasters wherein the broadcast transmissions contain information encoded therein to identify program segments broadcast by the broadcast receiver and a transmitter for transmitting wireless signals to the system, said method comprising the steps of:

receiving a program segment signal transmitted from the mobile unit said program segment signal identifying the information encoded within the broadcast transmissions; and in response to receipt of the program segment signal providing information to the user of the mobile unit via the Internet representative of the content of the broadcast transmission received by the mobile unit.

29. A system for use with one or more broadcasters, said system comprising:

a plurality of mobile units each having a at least one command button, a broadcast receiver for receiving broadcast transmissions from broadcasters and a transmitter for wirelessly transmitting signals identifying a selected program segment of the broadcast transmission in response to the actuation of the command button; and a network processor having a network receiver for receiving the signals identifying the selected program segment, wherein the signals include a broadcast attribute signal identifying the command button actuated and at least one attribute of a program segment received by the mobile unit from one of the broadcasters; and a delivery unit responsive to receipt of the broadcast attribute signal, for providing information to the user of the mobile unit via the Internet representative of the content of the broadcast transmission received by the mobile units.

30. The system of claim 29 wherein at least one of said mobile units includes means for determining a geographical location of the mobile unit;

means for determining the carrier frequency of the broadcast;

means for determining the date and time of the program segment;

means for storing a subscriber identifier value; and wherein said receiver transmits the geographical location, the carrier frequency, the date and time and the subscriber identification value to the network processor.

31. The system of claim 30 wherein said means for determining a geographical location of the mobile unit is a global positioning system ("GPS") device.

32. The system of claim 29 wherein the network receiver of the network processor further includes a location identification unit that identifies the geographical location of the mobile unit by mapping the cellular base station that received the transmitted wireless signals to a predefined geographical area.

33. The system of claim 29 wherein the broadcast receiver includes one or more of an analog terrestrial broadcast receiver, a digital terrestrial broadcast receiver, and a digital satellite broadcast receiver.

34. An interactive radio mobile unit for use with an interactive radio system having a command button, a receiver for receiving signals pertaining to selected program segments and having a network processor for providing information to a user associated with the mobile unit via an Internet-enabled device with the information being representative of the content of the program segments received by the mobile unit, said mobile unit comprising:

a receiver for receiving broadcast transmissions from broadcasters;

a location determining unit for determining a geographical location of the mobile unit;

a frequency determination unit for determining the carrier frequency of the broadcast;

a date and time determination unit for determining the date and time of the program segment;

computer memory for storing a user identifier value; and a transmitter for wirelessly transmitting the geographical location, the carrier frequency, the date and time, and a user identifier value to the network processor substantially immediately upon the actuation of the command button.

* * * * *

UNITED STATES PATENT AND TRADEMARK OFFICE
CERTIFICATE OF CORRECTION

PATENT NO. : 6,628,928 B1 Page 1 of 1
DATED : September 30, 2003
INVENTOR(S) : Gary Keith Noreen and Stephen P. Crosby It is certified that error appears in the above-identified patent and that said Letters Patent is hereby corrected as shown below:

<u>Title page,</u>
Item [12], please replace "Crosby et al." with -- Noreen et al. --.
Item [75], Inventors, please replace "Inventors: Stephen P. Crosby, Brookline, MA (US); Gary Keith Noreen, La Canada Flintridge, CA (US)" with -- Inventors: Gary Keith Noreen, La Canada Flintridge, CA (US); Stephen P. Crosby, Brookline, MA (US) --.

Signed and Sealed this

Twentieth Day of January, 2004

JON W. DUDAS
*Acting Director of the United States Patent and Trademark Office*